United States Patent [19]
Uchida

[11] Patent Number: 6,047,079
[45] Date of Patent: Apr. 4, 2000

[54] METHOD OF AND AN APPARATUS FOR PRE-SELECTING FINGERPRINT CARDS

[75] Inventor: Kaoru Uchida, Tokyo, Japan

[73] Assignee: NEC Corporation, Tokyo, Japan

[21] Appl. No.: 08/997,260

[22] Filed: Dec. 23, 1997

[30] Foreign Application Priority Data

Dec. 27, 1996 [JP] Japan .................................. 8-349879

[51] Int. Cl.[7] .............................. G06K 9/00; B42D 15/00
[52] U.S. Cl. .......................... 382/124; 382/125; 382/224; 283/68
[58] Field of Search .................................... 382/124, 125, 382/116, 224, 225; 283/69; 356/71

[56] References Cited

U.S. PATENT DOCUMENTS

| 5,465,303 | 11/1995 | Levison et al. ......................... 382/124 |
| 5,659,626 | 8/1997 | Ort et al. ................................. 382/125 |

FOREIGN PATENT DOCUMENTS

| 63-34508 | 7/1988 | Japan ............................... G06K 9/00 |
| 7-29003 | 1/1995 | Japan ............................... G06T 7/00 |
| 9-114981 | 5/1997 | Japan ............................... G06T 7/00 |

OTHER PUBLICATIONS

Shelman, C. B.: "Machine Classification of Fingerprints", Proceedings of the National Symposium on Law Enforcement, Science and Technology, 1967, pp 467–477, XP002061338, pp 474, paragraph 2 p. 476, paragraph 1; Figures 14–16.

C.V. Kameswara et al., "An Automated Fingerprint Classification System", IEE Proc. of the 2nd Int. Joint Conf. on Pattern Recognition, Aug. 13, 1974, pp. 180–184, XP002091730, Section "2. A proposed Single Fingerprint Classification System".

*Primary Examiner*—Leo H. Boudreau
*Assistant Examiner*—Shawn B. Cage
*Attorney, Agent, or Firm*—Foley & Lardner

[57] ABSTRACT

To provide an apparatus for pre-selecting fingerprint cards having certain similarity to an S-card to be identified, at a high-speed, among a plurality of F-cards, an apparatus of the invention comprises: an F-side cluster index determination section (2) for designating a cluster wherein feature data of the plurality of F-cards are to be classified according to features extracted from the plurality of F-cards; an F-card feature storing section (3) for storing the feature data of the plurality of F-cards in the cluster designated by the F-side cluster index determination section (2); an S-card feature storing section (5) for temporarily storing feature data of the S-card; an S-side cluster index determination section (6) for designating clusters to be retrieved according to a combination of features extracted from the S-card; and a fingerprint card matching discrimination unit (8) for pre-selecting the fingerprint cards by comparing the feature data of the S-card with the feature data of the plurality of F-cards stored the clusters designated by the S-side cluster determination section (6).

4 Claims, 5 Drawing Sheets

| $N_x$ | n | RETRIEVAL CLUSTERS |
|---|---|---|
| 0 | 10 | Q10 |
|  | 9 | Q9-z |
|  | 8 | Q8-z Q8-y |
|  | 7 | Q7-z Q7-y Q7-x |
|  | 6 | Q6-z Q6-y Q6-x Q6-w |
|  | – | Mix |
| 1 | 9 | Q10 Q9-a |
|  | 8 | Q9-z Q8-a Q8-z |
|  | 7 | Q8-z Q8-y Q7-a Q7-z Q7-y |
|  | 6 | Q7-z Q7-y Q7-x Q6-a Q6-z Q6-y Q6-x |
|  | – | all |
| 2 | 8 | Q10 Q9-a Q9-b Q8-a Q8-b |
|  | 7 | Q9-z Q8-a Q8-b Q8-z Q7-a Q7-b Q7-z |
|  | 6 | Q8-z Q8-y Q7-a Q7-b Q7-z Q7-y Q6-a Q6-b Q6-z Q6-y |
|  | – | all |
| – | – | all |

FIG.6 PRIOR ART

METHOD OF AND AN APPARATUS FOR PRE-SELECTING FINGERPRINT CARDS

BACKGROUND OF THE INVENTION

The present invention relates to a collation system of a fingerprint card such as the Ten Print Card, and particularly to a method of and an apparatus for pre-selecting fingerprint card having certain similarity to an S-card to be identified among a plurality of F-cards registered in a data base in order to reduce number of fingerprint cards to be subjected to fine verification.

Consider a case where a fingerprint card including fingerprint images of fingers obtained from a specific person (hereafter called a search card, or a S-card) is verified whether there is a fingerprint card of the same person in a large scale database wherein a number (M) of fingerprint cards (hereafter called filed cards, or F-cards), each taken from each of M persons and having the same format with the S-card, are registered.

As for verification method of identity between a pair of fingerprint images, a method making use of minutia verification is well known and disclosed, for example, in a Japanese patent published with specification No. 34508/'88. By way of the above minutia verification apparatus, a card having identity with the S-card can be retrieved in the F-cards with sufficient precision, by repeating the minutia verification of each of ten fingerprint images of the S-card for each of ten fingerprint images of each of the F-cards. However, it takes a lot of computational time when M is large, needing M×(average valid finger number/card) times of the minutia verification.

Therefore, it is effective for reducing total computational time to reduce number of F-cards to be finely verified by way of a pre-selection, wherein certain feature data extracted from each fingerprint pattern of each of the F-cards are compared to feature data extracted from each respective fingerprint pattern of the S-card, and only F-cards of feature data having a certain similarity to those of the S-card are selected to be processed with the fine verification, other discordant F-cards being rejected without performing the fine verification.

Hereafter, this procedure to determine a set of the F-cards, whereof coincidence to the S-card is to be finely verified, will be called the pre-selection.

For realizing the pre-selection, an apparatus is disclosed by us in a Japanese patent application laid open as a Provisional Publication No. 114981/'97, wherein a similarity value between two fingerprint cards is estimated by comparing pattern level classification and sub-pattern level features of each of ten fingerprint patterns between the two fingerprint cards, and accordance/discordance of the two fingerprint cards is determined by comparing the similarity value to a threshold value.

Figure 6:
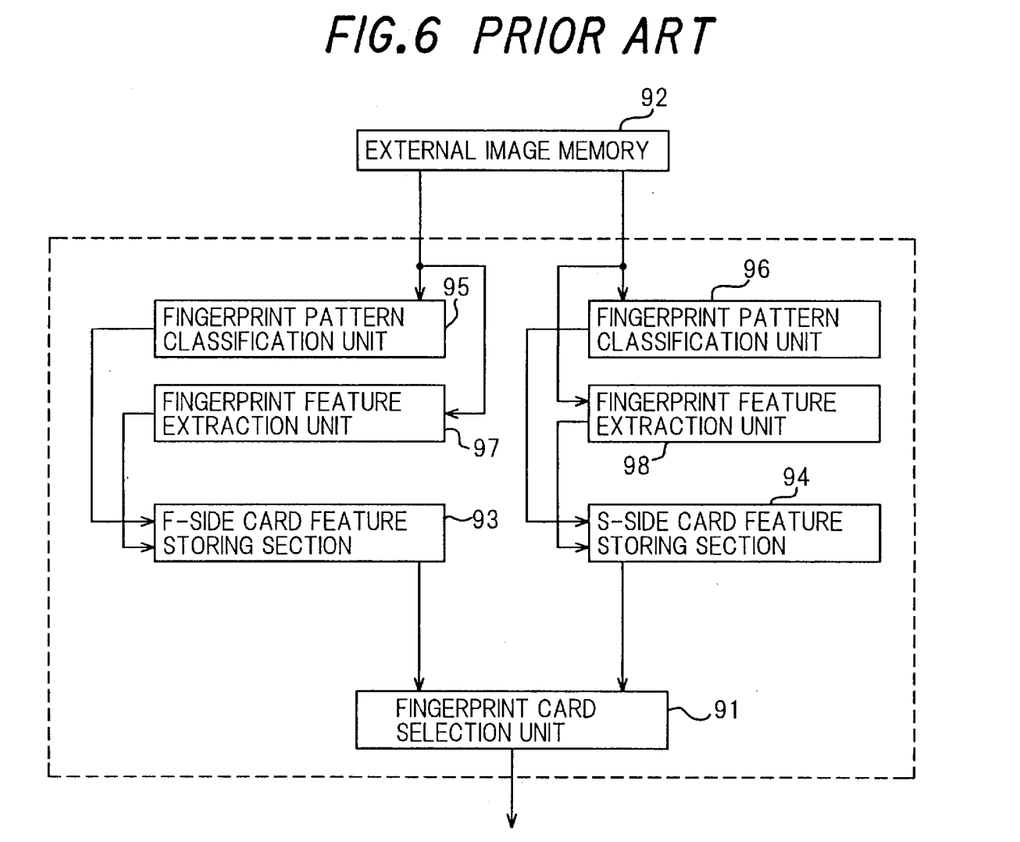
FIG. 6 is a block diagram illustrating configuration of a prior art apparatus.

FIG. 6 is a block diagram illustrating configuration of this apparatus.

In the prior art apparatus of FIG. 6, data of pattern level classifications and sub-pattern level features of ten fingerprints of each of M sheets of the F-cards are obtained by a fingerprint pattern classification unit 95 and a fingerprint feature extraction unit 97 from an external image memory 92, and prepared in a F-side card feature storing section 93.

When data of an S-card is input, a fingerprint pattern classification unit 96 and a fingerprint feature extraction unit 98 extract data of the pattern level classification and the sub-pattern level features of the S-card in the same way for storing them in an S-side card feature storing section 94.

For the pre-selection, the data of the S-card and data of each of the F-cards are input to a fingerprint card selection unit 91, which calculates the similarity value between them and determines whether the concerning F-card is to be processed with the fine verification or not by comparing the similarity value to a predetermined threshold value. By repeating above procedure for data of every of M sheets of the F-cards, the pre-selection is performed. Since the calculation amount necessary for the pre-selection is far smaller than that necessary for the fine verification of the F-cards rejected by the pre-selection, total calculation amount for identifying the S-card can be considerably reduced, enabling a remarkable high-speed processing.

However, in the prior art apparatus of FIG. 6, the similarity value estimation is performed by the fingerprint card selection unit 91 successively for data of every of M sheets of F-cards, which takes still a certain computational time and a large calculation ability is required even for performing the pre-selection when number M of F-cards becomes large.

SUMMARY OF THE INVENTION

Therefore, a primary object of the present invention is to provide a method of and an apparatus for pre-selecting fingerprint cards, which are to be subjected to fine verification, at a high-speed by selecting minimum necessary clusters to be retrieved among clusters wherein the F-cards are beforehand classified according to features extracted from fingerprint patterns of the F-cards.

In order to achieve the object, an apparatus of the invention, for pre-selecting fingerprint cards having certain similarity to an S-card to be identified among a plurality of F-cards registered in a database, comprises:

an F-side cluster index determination section for designating a cluster wherein feature data of each of the plurality of F-cards are to be classified according to a combination of features extracted from respective each of the plurality of F-cards;

an F-card feature storing section for storing the feature data of each of the plurality of F-cards in the cluster designated by the F-side cluster index determination section among clusters provided therein;

an S-card feature storing section for temporarily storing feature data of the S-card;

an S-side cluster index determination section for designating at least one of the clusters to be retrieved according to a combination of features extracted from the S-card;

an F-card cluster selection section for selecting the at least one of the clusters designated by the S-side cluster index determination section; and a fingerprint card matching discrimination unit for pre-selecting the fingerprint cards having certain similarity to the S-card by comparing the feature data of the S-card stored in the S-card feature storing section with the feature data of each of the plurality of F-cards stored in said at least one of the clusters selected by the F-card selection section.

The method applied in the above apparatus comprises:

a step of storing feature data of each of the plurality of F-cards in one of clusters determined according to predetermined criteria from a combination of features extracted from respective each of the plurality of F-cards;

a step of determining at least one of the clusters to be selected for retrieval according to the predetermined criteria from a combination of features extracted from the S-card; and a step of pre-selecting the fingerprint cards having certain similarity to the S-card by comparing feature data of the S-card with the feature data of each of the plurality of F-cards stored in said at least one of the clusters determined to be selected for retrieval.

Therefore, the number of F-cards subjected to the fine verification can be effectively reduced with little probability of incorrect rejection, according to the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
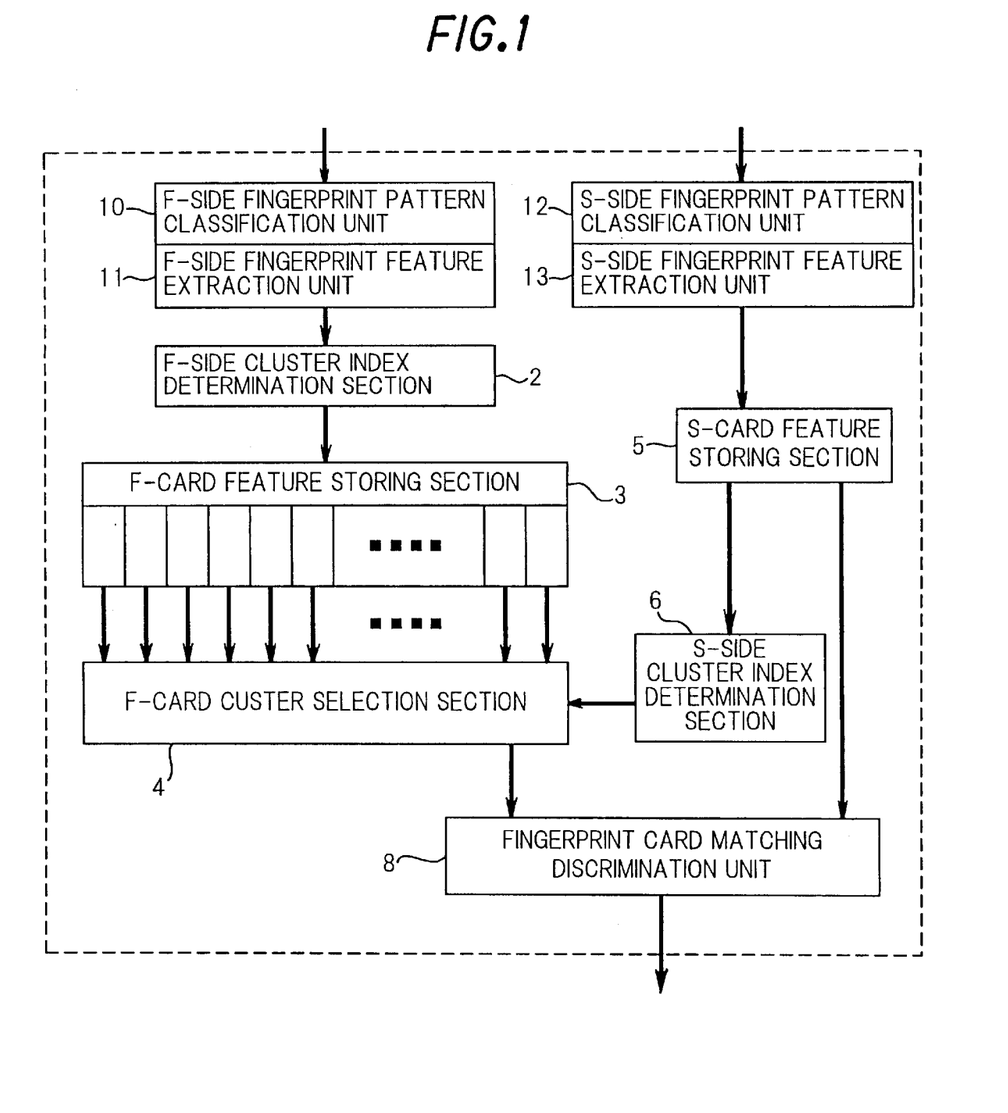
FIG. 1 is a block diagram illustrating basic configuration an apparatus according to an embodiment of the invention for pre-selecting fingerprint cards in order to reduce number of fingerprint cards to be finely verified.

FIG. 1 is a block diagram illustrating basic configuration an apparatus according to an embodiment of the invention for pre-selecting fingerprint cards in order to reduce number of fingerprint cards to be finely verified.

In this embodiment, feature data of N (N being an integer not more than 10) fingerprints are before hand extracted from every of M sheets of the F-cards. In the following paragraphs, the embodiment is described assuming that, on every of the F-cards, there are printed ten fingerprints each obtained from each of ten fingers of a person, and classification of the F-cards is performed according to feature data of the ten fingerprints.

The apparatus of FIG. 1 comprises an F-side fingerprint pattern classification unit 10, an F-side fingerprint feature extraction unit 11, an F-side cluster index determination section 2, an F-card feature storing section 3, an F-card cluster selection section 4, an S-side fingerprint pattern classification unit 12, an S-side fingerprint feature extraction unit 13, an S-card feature storing section 5, an S-side cluster index determination section 6, and a fingerprint card matching discrimination unit 8.

Each of the F-side fingerprint pattern classification unit 10 and the S-side fingerprint pattern classification unit 12 classifies a fingerprint into a classification category and outputs a classification result together with a confidence value representing certainty of the classification when image data of the fingerprint is supplied from outside, an external memory, for example.

As for the F-side fingerprint pattern classification unit 10 and the S-side fingerprint pattern classification unit 12, any conventional apparatus can be applied provided that an appropriate classification result and its confidence value can be obtained from image data of a fingerprint. Here, the embodiment is described according to an example where the fingerprint pattern classification unit (95, 96) of FIG. 6 described in the previous Provisional Publication No. 114981/97 is applied to them, and a pattern level classification result such as a Loop a Whorl, an Arc, and so on, is assigned to a fingerprint together with its confidence value according to ridge line flows and positional information of singular points extracted from image data of the fingerprint. When any pattern level classification can not be assigned to a fingerprint with certain confidence level because of degradation of image data of the fingerprint, for example, a classification "Uncertain" is assigned with confidence value of zero.

Each of the F-side fingerprint feature extraction unit 11 and the S-side fingerprint feature extraction unit 13 extracts features of the fingerprint and outputs them as sub-pattern level features of the fingerprint together with a confidence value representing certainty of the features.

As for also the F-side fingerprint feature extraction unit 11 and the S-side fingerprint feature extraction unit 13, any conventional apparatus can be applied provided that an appropriate feature data and their confidence value can be obtained from image data of a fingerprint. Here, in the embodiment, the fingerprint feature extraction unit (97, 98) of FIG. 6 is described to be applied to them, by way of example. In the above fingerprint feature extraction unit, coordinates of singular points such as a Core or a Delta in the fingerprint are calculated from image data of the fingerprint to be output as the sub-pattern level features together with confidence of the features. When any effective feature data can not be extracted from a fingerprint with certain confidence level because of degradation of image data of the fingerprint, for example, the sub-pattern level features of the fingerprint are defined as "Uncertain".

According to combination of the pattern level classification results of fingerprints taken from right and left index fingers of each of the F-cards, the F-side cluster index determination section 2 determines a cluster wherein concerning each of the F-cards is to be classified.

In this example, the pattern level classification is again grouped into one of four classification indices "U" (Ulnar Loop: a Loop which has ridge line flows beginning from and returning to little finger side), "W" (the Whorl), "A" (the Arch) and "X" (other patterns including the "Uncertain"). Therefore, the F-cards are classified into one of following 16 clusters according to combination of two classification indices; (left index finger, right index finger)=(U, U), (U, W), (U, A), (U, X), (W, U), ..., (X, X).

The F-card feature storing section 3 registers feature data of each of the F-cards together with its card information in one of the 16 clusters determined according to combination of the two classification indices.

Thus, information of M sheets of the F-cards is prepared classified into 16 clusters in the F-card feature storing section 3.

When there is given an S-card of a person to be verified whether an F-card of the same person is registered or not in the F-card feature storing section 3, image data of the S-card are input to the S-side fingerprint pattern classification unit 12 and the S-side fingerprint feature extraction unit 13 for obtaining the pattern level classification and the sub-pattern level features of the S-card to be stored in the S-card feature storing section 5, in the same way with the F-side fingerprint pattern classification unit 10 and the F-side fingerprint feature extraction unit 11.

The S-side cluster index determination section 6 determines combination of the two classification indices of the S-card in the same way with the F-side cluster index determining section 2 according to the pattern level classification results of fingerprints taken from of right and left index fingers of the S-card.

The F-card cluster selection section 4 selects cluster(s) wherefrom data of F-cards are to be checked by the fingerprint card matching discrimination unit 8, as follows.

1. To select a cluster having the same combination of the two classification indices with that of the S-card, if there is one.

2. To select three other clusters, too, each corresponding to the index combination obtained by replacing the index "X" with each of indices "U", "W" and "A" of the index combination of the S-card, if it includes the index "X".

3. To select, accordingly, all clusters when the index combination of the S-card is (X, X).

For example, four clusters having index ensambles (U, X), (U, U), (U, W) and (U, A) are selected when that of the S-card is (U, X).

The fingerprint card matching discrimination unit 8 estimates similarity of the pattern level classifications and sub-pattern level features extracted from ten fingerprints of the S-card to those of each of the F-cards registered in the clusters selected as above described, successively. Here, also any conventional apparatus can be applied to the fingerprint card matching discrimination unit 8 provided that it can estimate similarity of feature data extracted by the apparatuses applied to the F-side fingerprint pattern classification unit 10 or the S-side fingerprint pattern classification unit 12 and the F-side fingerprint feature extraction unit 11 or the S-side fingerprint feature extraction unit 13.

In this example, the fingerprint card selection unit 91 of FIG. 6 described in the Provisional Publication No. 114981/97 is applied to the fingerprint card matching discrimination unit 8 of FIG. 1.

Figure 2:
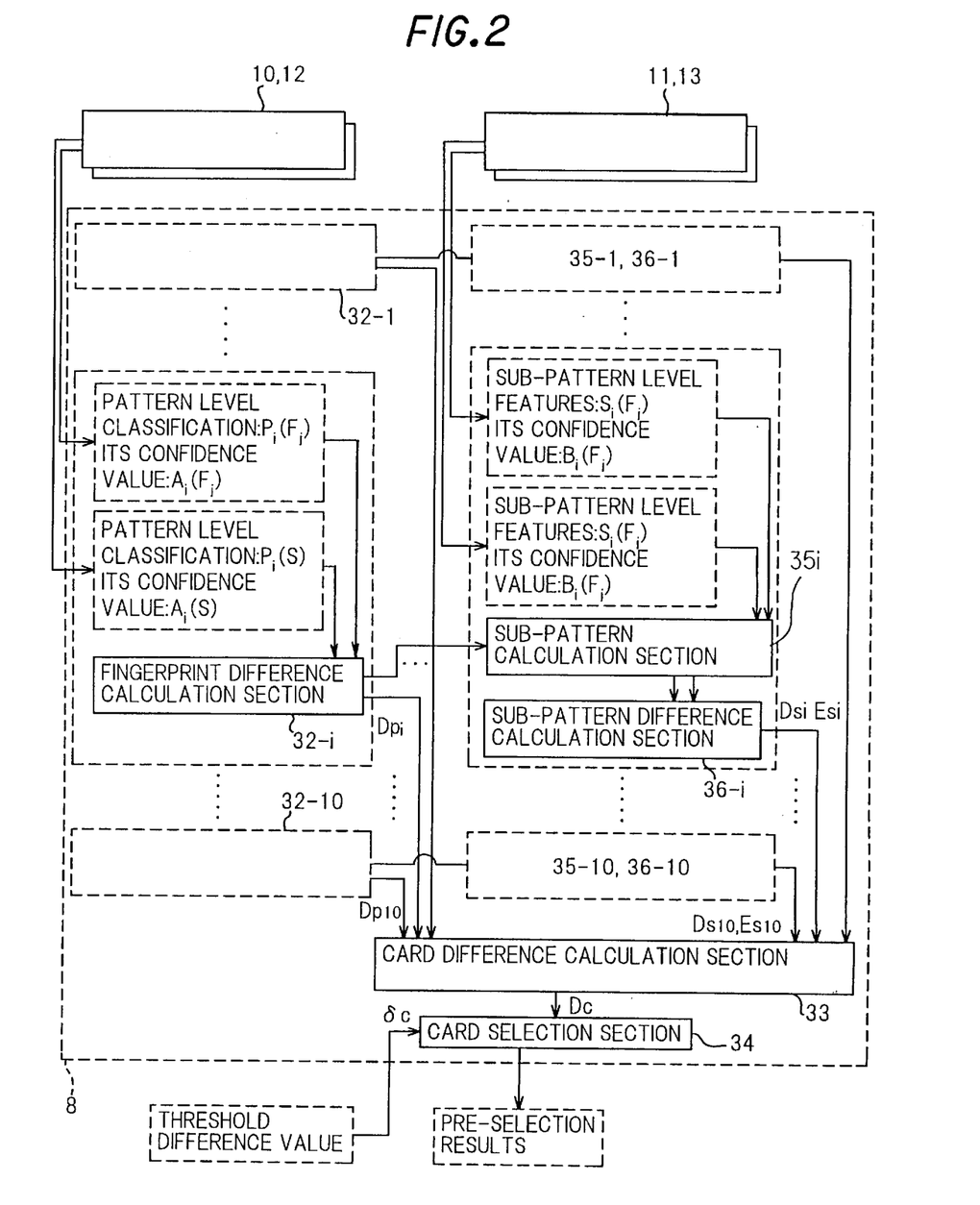
FIG. 2 is a block diagram illustrating basic configuration of the fingerprint card matching discrimination unit 8 of FIG. 1.

FIG. 2 is a block diagram illustrating basic configuration of the fingerprint card matching discrimination unit 8 of FIG. 1.

Referring to FIG. 2, the fingerprint card matching discrimination unit 8 comprises a first to a tenth fingerprint pattern difference calculation section 32-1 to 32-10, a first to a tenth sub-pattern calculation section 35-1 to 35-10, a first to tenth sub-pattern difference calculation section 36-1 to 36-10, a card difference calculation section 33, and a card selection section 34.

As above described, the fingerprint card matching discrimination unit 8 estimates similarity of the pattern level classifications and sub-pattern level features extracted from ten fingerprints of the S-card to those of each of the F-cards registered in the selected clusters.

Suppose there are data of M1 sheets of the F-cards in the selected clusters and data of j-th (j=1, 2, . . . , M1) of them are processed.

To i-th fingerprint pattern difference calculation section 32-i (i=1, 2, . . . , 10), pattern level classification $P_i(F_j)$ of i-th finger of the j-th F-card and its confidence value $A_i(F_j)$ and those $P_i(S)$ and $A_i(S)$ of the S-card are supplied from the F-card cluster selection section 4 and the S-card feature storing section 5. The i-th fingerprint pattern difference calculation section 32-i calculates a pattern difference $Dp_i$ of the i-th finger as follows.

$$Dp_i = \begin{cases} -A_i(F_j) \times A_i(S) & (\text{when } P_i(F_j) = P_i(S)) \\ A_i(F_j) \times A_i(S) & (\text{when } P_i(F_j) \neq P_i(S)) \end{cases}$$

Thus, from each of the first to the tenth fingerprint pattern difference calculation section 32-1 to 32-10, pattern differences $Dp_1$ to $Dp_{10}$ of ten fingers are output to the card difference calculation section 33.

By the way, when either of $P_i(F_j)$ and $P_i(S)$ is "Uncertain", the pattern difference $Dp_i$ becomes zero, either of $A_i(F_j)$ and $A_i(S)$ being zero.

At the same time, sub-pattern level features $S_i(F_j)$ and their confidence value $B_i(F_j)$ of the j-th F-card are supplied to i-th sub-pattern calculation section 35-i together with those $S_i(S)$ and $B_i(S)$ of the S-card. The sub-pattern level features $S_i(F_j)$ and $S_i(S)$ include coordinate information of singular points, that it, two Cores and two Deltas in a "Whorl" and one Core and one Delta in a "Loop", of respective fingerprints, and the confidence values $B_i(F_j)$ and $B_i(S)$ include confidence value of coordinates of each of the singular points.

Referring to accordance/decordance of the pattern level classifications $P_i(F_j)$ and $P_i(S)$, the i-th sub-pattern calculation section 35-i calculates distances between singular points in respective fingerprints and their confidence values from the sub-pattern level features $S_i(F_j)$ and $S_i(S)$ and their confidence values $B_i(F_j)$ and $B_i(S)$. From the distances and their confidence values calculated by the sub-pattern calculation section 35-i, the sub-pattern difference calculation section 36-i calculates sub-pattern difference $Ds_i$ and its confidence products $Es_i$ as follows.

1. When $P_i(F_j)=P_i(S)=$"Loop";

$$Ds_i = |Df - Ds| \cdot Es_i - C$$

$$Es_i = Bf \cdot Bs.$$

Here, Df and Bf are the distance between the Core and the Delta and its confidence value of F-side fingerprint, while Ds and Bs are those of S-side fingerprint, and C is a positive constant (30, for example) subtracted for shifting from 0 (discordance or uncertain).

2. When $P_i(F_j)=P_i(S)=$"Whorl";

$$Ds_i = \frac{1}{6}\sum_{k=1}^{6} |Df^k - Ds^k| \cdot Es_i^k - C$$

$$Es_i^k = Bf^k \cdot Bs^k$$

$$Es_i = \frac{1}{6}\sum_{k=1}^{6} Es_i^k.$$

Here, $Df^k$ and $Bf^k$ (k=1 to 6) are the distance between every two of the four singular points and its confidence value of F-side fingerprint, while $Ds^k$ and $Bs^k$ are respective those of S-side fingerprint.

3. Otherwise;

$$Ds_i = Es_i = 0.$$

Thus, from each of the first to the tenth sub-pattern difference calculation section 35-1 to 35-10, sub-pattern differences $Ds_1$ to $Ds_{10}$ and their confidence products $Es_1$ to $Es_{10}$ of ten fingers are output to the card difference calculation section 33.

From the pattern differences $Dp_1$ to $Dp_{10}$, the sub-pattern differences $Ds_1$ to $Ds_{10}$ and their confidence products $Es_1$ to $Es_{10}$, the card difference calculation section 33 calculates card difference $D_C$ between the S-card and the concerning F-card as follows.

$$D_C = \sum_{i=1}^{10} Dp_i + \frac{\sum_{i=1}^{10} Ds_i}{\sum_{i=1}^{10} Es_i}$$

Left side second term of the above equation represents a mean of sub-pattern differences (distance differences) of ten fingers weighted by their confidence values. When number of fingerprints in a fingerprint card is limited to N, the summations $\Sigma_{i=1}^{10}$ of the above equation become $\Sigma_{i=1}^{N}$.

The card selection section 34 compares the card difference $D_C$ of each of the M1 sheets of F-card to a predetermined threshold difference value $\delta_C$ and selects F-cards to be finely verified when they give the card differences $D_C$ more than the threshold difference value $\delta_C$, rejecting other F-cards. Each of the selected F-cards are processed finger by finger in a card identification section (not depicted in the drawings) with the minutia verification, for example, to be determined whether it is the F-card of the same person of the S-card of not.

Thus, an S-card is verified in the embodiment of FIG. 1.

Compared to the prior apparatus of FIG. 6, wherein data of all of the registered F-cards are verified successively to pre-select candidate F-cards to be verified finely for an S-card, verification process is performed only for F-cards classified in clusters selected by the F-card cluster selection section 4, in the embodiment. The classification of the F-cards is performed according to the combination of two classification indices of right and left index fingers, and rejected clusters have index combinations apparently different to the index combination of the S-card.

Therefore, the number of F-cards subjected to the fine verification can be effectively reduced with little probability of incorrect rejection, in the embodiment.

As above described, the classification of the F-cards into clusters is performed according to the combination of two classification indices of right and left index fingers, in the embodiment. This is based on experimental facts that comparatively high classification precision can be obtained for the right and left index fingers and there are but few fingerprints to be classified into "Uncertain". Furthermore, by classifying according to the above criteria, that is, according to the above index ensambles, quasi-equal distribution of the F-cards can be obtained among 16 clusters.

However, the scope of the invention is not limited in the above criteria. The F-cards, and the S-card, may be classified according to classification indices of another pair of fingers, or into more number of clusters making use of fingerprint pattern level classification results of more than one pair of fingers, for improving pre-selection efficiency, for example. Or, on the other hand, pattern level classification result with confidence value lower than a threshold value may be grouped into the index "X" in the F-side cluster index determination section 2 and/or in the S-side cluster index determination section 6, in order to make lower the probability of incorrect rejection.

Now, a second embodiment of the invention will be described, which has the same configuration with the embodiment of FIG. 1, but some modifications lie in operation of the F-side cluster index determination section 2, the S-side cluster determination section 6, the F-card feature storing section 3 and the F-card cluster selection section 4.

In the second embodiment, the F-side cluster index determination section 2 determines a cluster whereto an F-card is classified according to the majority pattern level classification among ten fingers and the number of fingers of the majority pattern level classification, as follows, ignoring fingers whereof pattern level classification is "Uncertain".

1. When more than four of ten fingers have the pattern level classification "U" (Ulnar Loop), data of concerning F-card are registered into a cluster $U_n$, (n=5 to 10: number of fingers having the pattern level classification "U").

2. When more than five of ten fingers have the pattern level classification "W" (Whorl), data of concerning F-card are registered into a cluster $W_n$, (n=6 to 10: number of fingers having the pattern level classification "W").

3. Otherwise, data of concerning F-card are registered into a cluster Mix.

Figure 3:
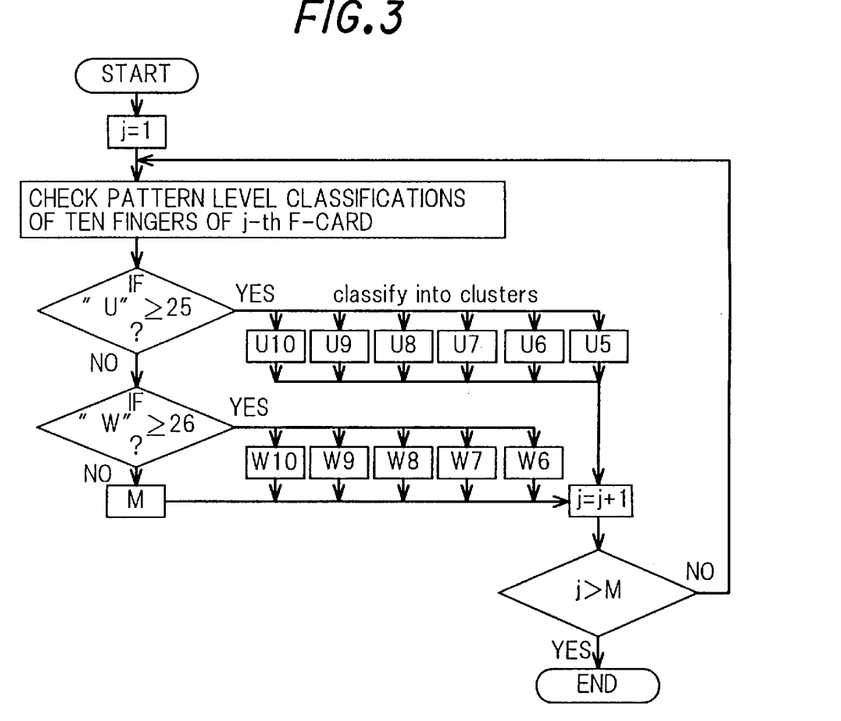
FIG. 3 is a flowchart illustrating the classification process performed for each (j-th) of M sheets of the F-cards in the F-side cluster index determination section 2 of a second embodiment of the invention.

FIG. 3 is a flowchart illustrating the classification process performed for each (j-th) of M sheets of the F-card in the F-side cluster index determination section 2 of the second embodiment.

In the same way, the S-side cluster index determination section 6 determines a cluster whereof F-cards to be finely verified are selected when an S-card is given to be identified, as follows, ignoring fingers whereof pattern level classification is "Uncertain".

1. To select a cluster $U_n$, (n=5 to 10: number of fingers having the pattern level classification "U") when more than four of ten fingers have the pattern level classification "U" (Ulnar Loop).

2. To select a cluster $W_n$, (n=6 to 10: number of fingers having the pattern level classification "W") when more than four of ten fingers have the pattern level classification "W" (Whorl).

3. To select the cluster Mix, otherwise.

Figure 4:
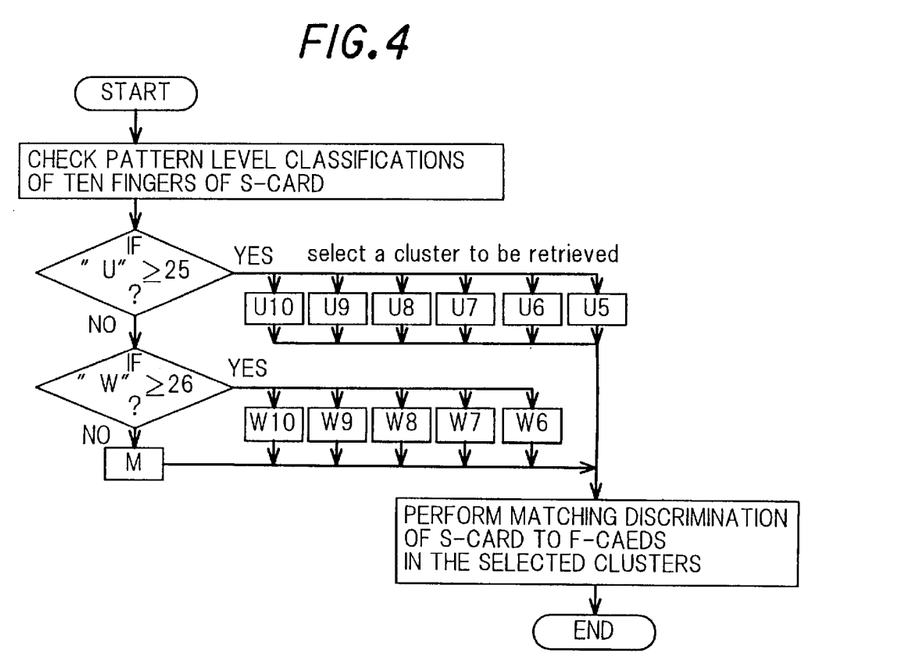
FIG. 4 is a flowchart illustrating the cluster index determination process performed in the S-side cluster index determination section 6 of the second embodiment.

FIG. 4 is a flowchart illustrating the cluster index determination process performed in the S-side cluster index determination section 6 of the second embodiment, according to which the F-card cluster selection section 4 select the cluster whereof data of F-cards are subjected to the fine verification.

The fingerprint card matching discrimination unit 8 estimates similarity of the pattern level classifications and sub-pattern level features extracted from ten fingerprints of the S-card to those of each of the F-cards registered in the cluster thus selected, successively, in the same way with the first embodiment.

These criteria of the cluster classification of the second embodiment are based on experimental facts that fingerprint pattern level classifications of ten fingers of a person show high correlation among then and it gives a higher probability that the Ulnar Loop or the Whorl is the majority in the ten fingers. According to the facts, the clusters $U_5$ to $U_{10}$ and $W_6$ to $W_{10}$ are so defined that number of members of the cluster Mix becomes as small as possible and member numbers of other clusters become as equal as possible. However, another majority pattern level classification may be taken in consideration in the scope of the invention, of course. Or the F-cards in the cluster Mix may be again classified into several clusters making use of combination of classification indices of right and left index fingers, as described in connection with the first embodiment.

In the second embodiment, one cluster determined by the S-card cluster determination section 6 is selected. However, more than one cluster may be selected, as a following third embodiment, for example, taking in consideration a case where a finger print pattern level classification "U" or "W" of a finger might grouped into the index "X".

1. To select one cluster in the same way with the second embodiment, when no finger of the S-card is grouped into the index "X".

2. To select also a neighboring upper cluster when there is one finger grouped into the index "X" in the S-card, that is;

a) to select clusters $U_n$ and "$U_{n+1}$" when $5 \leq n \leq 9$ fingers are grouped into "U",
   b) to select clusters Mix and $U_5$ when four fingers are grouped into "U";
   c) to select clusters $W_n$ and "$W_{n+1}$" when $6 \leq n \leq 9$ fingers are grouped into "W",
   d) to select clusters Mix and $W_6$ when five fingers are grouped into "W";
   e) to select clusters Mix, $U_5$ and $W_6$ when four fingers are grouped into "U" and five fingers are grouped into "W";

3. To select all clusters when there are more than one finger grouped into the index "X" in the S-card.

Or, upper two or more clusters may be also selected together with corresponding cluster when there are more than one finger grouped into the index "X" in the S-card, instead of selecting all clusters.

Here also, pattern level classification result with confidence value lower than a threshold value may be grouped into the index "X" in the F-side cluster index determination section 2 and/or in the S-side cluster index determination section 6, in order to make lower the probability of incorrect rejection.

In a fourth embodiment of the invention, the pre-selection of the F-cards is performed as will be described in the following paragraphs, in the F-side cluster index determination section 2, the S-side cluster determination section 6, the F-card feature storing section 3 and the F-card cluster selection section 4.

The F-side cluster index determination section 2 of the fourth embodiment checks positions or finger numbers (denoted by 0 to 4 from the thumb to the little finger of left hand and by 5 to 9 from the thumb to the little finger of right hand) of minority pattern level classifications as well as the majority pattern level classification and the number of fingers of the majority pattern level classification, and determines clusters whereto the F-cards are to be classified in the F-card feature storing section 3, as follows.

1. When the majority pattern level classification is "U" (Ulnar Loop), number of fingers "U" is n ($6 \leq n \leq 10$), and finger positions of minority pattern level classification are $p_i$ ($0 \leq i \leq 10-n$), corresponding F-cards are classified into clusters Un-$p_i$.

2. When the majority pattern level classification is "W" (Whorl), number of fingers of "W" is n ($6 \leq n \leq 10$), and finger positions of minority pattern level classifications are $p_i$ ($0 \leq i < 10-n$), corresponding F-cards are classified into clusters Wn-$p_i$.

3. Otherwise, the F-cards are classified into a cluster Mix.

The S-side cluster index determination section 6 checks, of the S-card to be identified;

the majority pattern level classification Q (U or W), number n of fingers of the majority pattern level classification Q, number $N_x$ of fingers of the pattern level classification "Uncertain", finger positions a, b, c, . . . of fingers of the pattern level classification "Uncertain", and finger positions z, x, y, . . . of fingers of minority pattern level classifications.

Figure 5:
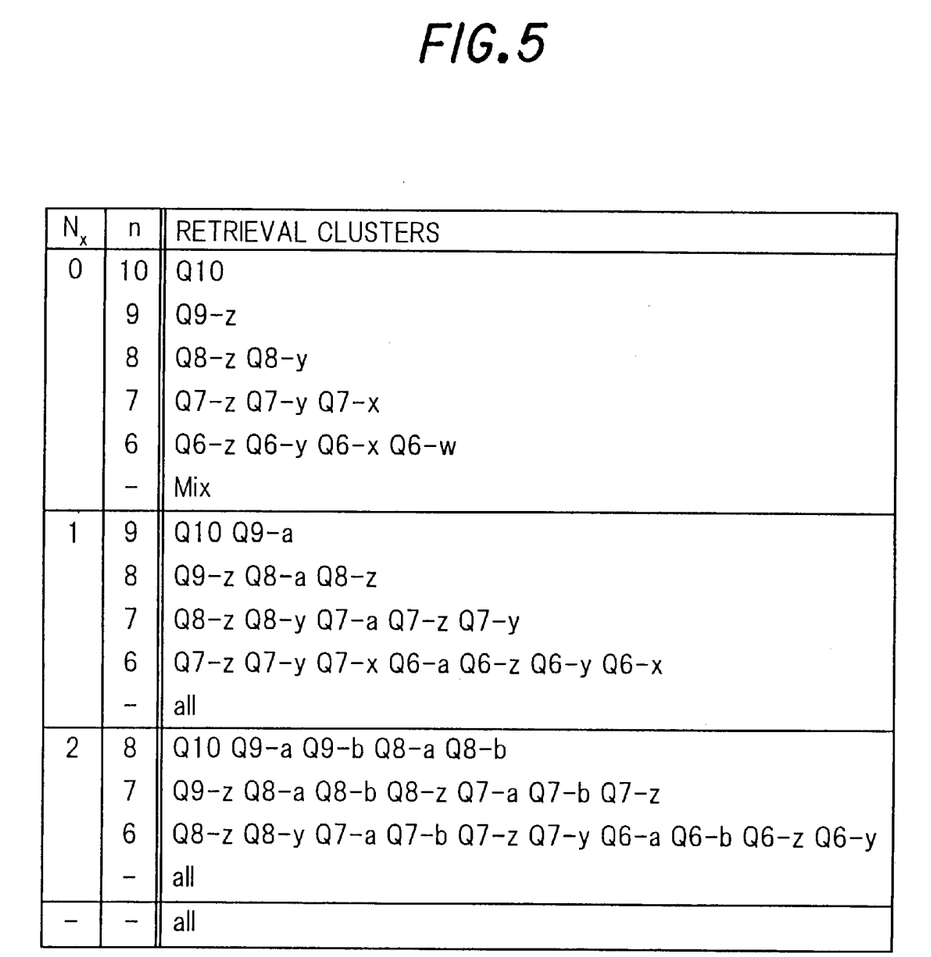
FIG. 5 is a schematic diagram illustrating a reference table used in a fourth embodiment of the invention.

According to these data, the F-card cluster selection section 4 selects clusters wherefrom the F-cards are verified by the fingerprint card matching discrimination unit 8, referring to a table shown in FIG. 5.

In FIG. 5, signs '–' represents all other values than those listed above '–', and "all" means all clusters in the F-card feature storing section 3. When pattern level classification of a finger of position 3 is "Uncertain", that of a finger of position 7 is "Arch" and that of other eight fingers is "Ulnar Loop", for example, $N_x=1$ and n=8 indicating an entry of Q9-z, Q8-a and Q8-z in the table of FIG. 5, and so, clusters U9-7, U8-3 and U8-7 are selected.

The table of FIG. 5 is prepared according to following criteria.

As for a case where $N_x=2$, n=7, a, b being finger positions of "Uncertain", and z being finger position of a minority pattern level classification, for example;

1. when fingers of positions a and b are both Q, n should become 9 and Q9-z should be selected,
2. when a finger of position a is Q and a finger of position b is not Q, n should become 8 and Q8-b and Q8-z should be selected,
3. when a finger of position b is Q and a finger of position a is not Q, n should become 8 and Q8-a and Q8-z should be selected, and
4. when neither of fingers of positions a and b is Q, n should become 7 and Q7-a, Q7-b and Q7-z should be selected.

Therefore, Q9-z, Q8-a, Q8-b, Q8-z, Q7-a, Q7-b and Q7-z are listed in the entry $N_x=2$ and n=7.

The entries indicated by $\{N_x=1$ and $n=-\}$, $\{N_x=2$ and $n=-\}$ and $\{N_x=-$ and $n=-\}$ may be divided into more detailed entries, or the F-cards in the cluster Mix may be again classified into several clusters making use of combination of classification indices of right and left index fingers, as described in connection with the first embodiment, of course.

Here, in the fourth embodiment, the same F-cards may be classified into more than one cluster when n>1, that is into clusters Un-$p_i$ or Wn-$p_i$ ($0 \leq i < 10-n$). Therefore it is preferably to provide a flag to every data set in the F-card feature storing section 3, which is reset at beginning of each S-card verification and set when another corresponding data set is verified in the fingerprint card matching determination unit 8, for preventing data set of the same F-card is checked doubly for the same S-card.

As heretofore described, the number of F-cards subjected to the fine verification can be effectively reduced with little probability of incorrect rejection, according to the first to the fourth embodiment, and their combination, of the invention, enabling a high-speed processing with comparatively small computational ability.

What is claimed is:

1. An apparatus for pre-selecting fingerprint cards, having certain similarity to an S-card to be identified, among a plurality of F-cards registered in a database, each of the S-card and the plurality of F-cards including data of fingerprints taken from more than one common finger of a person; said apparatus comprising:

an F-side cluster index determination section for designating a cluster wherein feature data of each of the plurality of F-cards are to be classified according to predetermined criteria from a combination of features extracted from each of the plurality of F-cards;

an F-card feature storing section for storing said feature data of each of the plurality of F-cards in said cluster designated by said F-side cluster index determination section among clusters provided therein;

an S-card feature storing section for temporarily storing feature data of the S-card;

an S-side cluster index determination section for designating at least one of said clusters to be retrieved according to said predetermined criteria from a combination of features extracted from the S-card;

an F-card cluster selection section for selecting said at least one of said clusters designated by said S-side cluster index determination section; and a fingerprint card matching discrimination unit for pre-selecting the fingerprint cards having certain similarity to the S-card by comparing said feature data of the S-card stored in said S-card feature storing section with said feature data of each of the plurality of F-cards stored in said at least one of said clusters selected by said F-card selection section;

wherein said predetermined criteria are determined in accordance with a number of fingerprints corresponding to a certain pattern level classification, and wherein said predetermined criteria corresponds to categorizing an F-card into a first category if a threshold number of fingerprints in said F-card matches a first feature pattern, categorizing said F-card into a second category if said threshold number of fingerprints in said F-card matches a second feature pattern, and categorizing said F-card into a third category corresponding to "UNKNOWN" when said F-card cannot be categorized into either the first category or the second category.

2. The apparatus for pre-selecting fingerprint cards as recited in claim 1, wherein said threshold number is equal to 10, said first feature pattern is a Whorl, and said second feature pattern is a Loop.

3. A method of pre-selecting fingerprint cards, having certain similarity to an S-card to be identified, among a plurality of F-cards registered in a database, each of the S-card and the plurality of F-cards including data of fingerprints taken from more than one common finger of a person; said method comprising:

storing feature data of each of the plurality of F-cards in one of a plurality of clusters determined according to predetermined criteria from a combination of features extracted from each of the plurality of F-cards;

determining at least one of said clusters to be selected for retrieval according to said predetermined criteria from a combination of features extracted from the S-card; and pre-selecting the fingerprint cards having certain similarity to the S-card by comparing feature data of the S-card with said feature data of each of the plurality of F-cards stored in said at least one of said clusters determined to be selected for retrieval;

wherein said predetermined criteria are determined in accordance with a number of fingerprints corresponding to a certain pattern level classification, and wherein said predetermined criteria corresponds to categorizing an F-card into a first category if a threshold number of fingerprints in said F-card matches a first feature pattern, categorizing said F-card into a second category if said threshold number of fingerprints in said F-card matches a second feature pattern, and categorizing said F-card into a third category corresponding to "UNKNOWN" when said F-card cannot be categorized into either the first category or the second category.

4. The method of pre-selecting fingerprint cards as recited in claim 3, wherein said threshold number is equal to 10, said first feature pattern is a Whorl, and said second feature pattern is a Loop.

* * * * *